United States Patent
Jeon

(10) Patent No.: US 11,265,902 B2
(45) Date of Patent: Mar. 1, 2022

(54) METHOD AND APPARATUS FOR SCHEDULING COORDINATED TRANSMISSION IN WIRELESS COMMUNICATION SYSTEM

(71) Applicant: Samsung Electronics Co., Ltd., Suwon-si (KR)

(72) Inventor: Joseph Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/819,498

(22) Filed: Mar. 16, 2020

(65) Prior Publication Data

US 2020/0221484 A1 Jul. 9, 2020

Related U.S. Application Data

(63) Continuation of application No. 15/544,728, filed as application No. PCT/KR2016/000118 on Jan. 7, 2016, now Pat. No. 10,595,330.

(30) Foreign Application Priority Data

Jan. 19, 2015 (KR) .................. 10-2015-0008950

(51) Int. Cl.
*H04W 72/12* (2009.01)
*H04W 16/04* (2009.01)
(Continued)

(52) U.S. Cl.
CPC ....... *H04W 72/1278* (2013.01); *H04W 16/04* (2013.01); *H04W 72/044* (2013.01);
(Continued)

(58) Field of Classification Search
None
See application file for complete search history.

(56) References Cited

U.S. PATENT DOCUMENTS

2009/0245331 A1 10/2009 Palanki et al.
2010/0142471 A1 6/2010 Cheng et al.
(Continued)

FOREIGN PATENT DOCUMENTS

EP 3 190 820 A1 7/2017
KR 10-2012-0081819 A 7/2012
(Continued)

OTHER PUBLICATIONS

SAMSUNG; Introduction of inter-eNB CoMP signalling; 3GPP TSG-RAN WG3 Meeting #86; R3-142658; Nov. 17-21, 2014; San Francisco, CA.
(Continued)

*Primary Examiner* — Saumit Shah
(74) *Attorney, Agent, or Firm* — Jefferson IP Law, LLP

(57) ABSTRACT

Method and apparatus for scheduling coordinated transmission in a wireless communication system are provided. According to various embodiments of the present disclosure, an apparatus for controlling resource utilization of a plurality of base stations comprises at least one transceiver configured to receive information about a buffer occupancy state from base stations performing a coordinated transmission, a processor configured to determine transmission states of the base stations based on the information about the buffer occupancy state. The at least one transceiver is further configured to transmit scheduling information comprising the transmission states.

10 Claims, 23 Drawing Sheets

(51) Int. Cl.
  *H04W 72/04* (2009.01)
  *H04W 92/12* (2009.01)
  *H04W 28/02* (2009.01)
  *H04W 88/08* (2009.01)
  *H04W 92/20* (2009.01)

(52) U.S. Cl.
  CPC .... *H04W 72/1205* (2013.01); *H04W 28/0278* (2013.01); *H04W 72/0433* (2013.01); *H04W 88/08* (2013.01); *H04W 92/12* (2013.01); *H04W 92/20* (2013.01)

(56) References Cited

U.S. PATENT DOCUMENTS

| | | |
|---|---|---|
| 2012/0178462 A1 | 1/2012 | Kim |
| 2012/0044852 A1 | 2/2012 | Zhang et al. |
| 2014/0023040 A1 | 1/2014 | Son et al. |
| 2014/0148181 A1 | 5/2014 | Lee et al. |
| 2014/0226481 A1 | 8/2014 | Dahod et al. |
| 2014/0286295 A1 | 9/2014 | Liu et al. |
| 2015/0312903 A1* | 10/2015 | Prasad .................. H04B 7/024 370/329 |
| 2016/0007280 A1 | 1/2016 | Ktenas et al. |
| 2016/0150512 A1* | 5/2016 | Zhang ............... H04W 72/0446 370/329 |
| 2017/0170937 A1 | 6/2017 | Chun et al. |
| 2017/0180016 A1* | 6/2017 | Park .................. H04W 72/0446 |

FOREIGN PATENT DOCUMENTS

| | | |
|---|---|---|
| KR | 10-1224098 B1 | 1/2013 |
| KR | 10-2014-0012837 A | 2/2014 |
| KR | 10-2014-0066652 A | 6/2014 |
| KR | 10-2014-0114759 A | 9/2014 |
| KR | 10-2016-0028167 A | 3/2016 |

OTHER PUBLICATIONS

3GPP; 3rd Generation Partnership Project; Technical Specification Group Radio Access Network; Evolved Universal Terrestrial Radio Access Network (E-UTRAN); X2 application protocol (X2AP); (Release 12); 3GPP TS 36.423; V12.4.0; Dec. 2014; Valbonne, France.

Korean Office Action dated Mar. 30, 2021, issued in Korean Application No. 10-2015-0008950.

* cited by examiner

| t | t+1 | t+2 | t+3 | t+4 |
|---|---|---|---|---|
| Mobile station #k | | Mobile station #k | Mobile station #k+4 | Mobile station #k+1 |
| Mobile station #k+1 | | | | Mobile station #k+4 |
| Mobile station #k+2 | | | | |

1102

| CSI of mobile station #k | CSI of mobile station #k+1 | ... |
|---|---|---|

| t | t+1 | t+2 | t+3 | t+4 |
|---|---|---|---|---|
| On | Off | On | Off | Off |

_1204_

| CSI of mobile station #k | CSI of mobile station #k+1 | ... |
|---|---|---|

FIG.12

METHOD AND APPARATUS FOR SCHEDULING COORDINATED TRANSMISSION IN WIRELESS COMMUNICATION SYSTEM

CROSS-REFERENCE TO RELATED APPLICATION(S)

This application is a continuation application of prior application Ser. No. 15/544,728, filed on Jul. 19, 2017, which has issued as U.S. Pat. No. 10,595,330 on Mar. 17, 2020 and is a U.S. National Stage application under 35 U.S.C. § 371 of an International application number PCT/KR2016/000118, filed on Jan. 7, 2016, which is based on and claimed priority of a Korean patent application number 10-2015-0008950, filed on Jan. 19, 2015, in the Korean Intellectual Property Office, the disclosure of which is incorporated by reference herein in its entirety.

TECHNICAL FIELD

The present disclosure relates to a wireless communication system, and more specifically, to method and apparatus for scheduling coordinated transmission in a wireless communication system.

BACKGROUND

A wireless communication system provides a wireless access service to a user equipment, and includes, to support mobility, transmission points which are referred to as base stations. The base station can provide the wireless access to mobile stations located in a geographical region of a certain range which is referred as a cell.

To provide a service without a spatial gap, the cells can be installed without intervals or to partially overlap each other. Accordingly, a signal transmitted from each cell can exert serious interference on a mobile station which communicates in a neighboring cell. Hence, various techniques for mitigating the interference are studied.

An example of the technique for mitigating the inter-cell interference is coordinated transmission. The coordinated transmission is a control scheme for a plurality of base stations to coordinate mutual signal transmissions to mitigate the inter-cell interference. However, to conduct the coordinated transmission, it is required to rapidly exchange information about resource use of base stations without latency. That is, ideal backhaul connections between the base stations are demanded.

The ideal backhaul can be achieved when hardware of the base stations is physically close or signal paths between the base stations are implemented with a medium which supports rapid communication. However, since an environment including the ideal backhaul cannot be expected for every wireless communication network, the implementation of the coordinated transmission is not guaranteed.

SUMMARY

An embodiment of the present disclosure provides an apparatus and a method for performing cooperative communication in a wireless communication system.

Another embodiment of the present disclosure provides an apparatus and a method for performing coordinated transmission in an environment with backhaul latency in a wireless communication system.

Yet another embodiment of the present disclosure provides an apparatus and a method for scheduling for coordinated transmission in a wireless communication system.

Still another embodiment of the present disclosure provides an apparatus and a method for controlling data transmission of base stations for coordinated transmission in a wireless communication system.

A further embodiment of the present disclosure provides an apparatus and a method for determining transmission constraints of base stations for coordinated transmission in a wireless communication system.

A method for operating an apparatus for controlling resource utilization of a plurality of base stations comprises receiving information about a buffer occupancy state from base stations performing a coordinated transmission, determining transmission states of the base stations based on the information about the buffer occupancy state, and transmitting scheduling information comprising the transmission states.

An apparatus for controlling resource utilization of a plurality of base stations comprises at least one transceiver configured to receive information about a buffer occupancy state from base stations performing a coordinated transmission, a processor configured to determine transmission states of the base stations based on the information about the buffer occupancy state. The at least one transceiver is further configured to transmit scheduling information comprising the transmission states.

Interference control and cooperative communication can be conducted even in a network having transmission delay in a wireless communication system, and thus efficient resource constraint between base stations is enabled.

BRIEF DESCRIPTION OF DRAWINGS

FIG. 11 depicts another example of control information provided to a resource coordinator in a wireless communication system according to an embodiment of the present disclosure.

FIG. 12 depicts yet another example of control information provided to a resource coordinator in a wireless communication system according to an embodiment of the present disclosure.

DETAILED DESCRIPTION

Hereinafter, an operational principle of the present disclosure is described in detail with reference to the accompanying drawings. In the following explanations, well-known functions or constitutions will not be described in detail if they would unnecessarily obscure the subject matter of the present disclosure. Also, terminologies to be described below are defined in consideration of functions in the present disclosure, and can vary depending on a user's or an operator's intention or practice. Thus, their definitions should be defined based on all the contents of the specification.

Hereafter, the present disclosure describes a scheduling technique for coordinated transmission in a wireless communication system. In particular, the present disclosure explains a technique for controlling transmission of each base station for the coordinated transmission in the wireless communication system.

Terms for indicating transmission schemes, terms for indicating network entities, terms for indicating information items, and terms for indicating connection states used in the following description are mentioned to ease the understanding. Accordingly, the present disclosure is not limited to those terms and can adopt other terms indicating targets having technically equivalent meanings.

A term such as ' . . . unit', ' . . . part' used in the following means a unit for processing at least one function or operation, which can be implemented using hardware, software, or a combination of hardware and software.

To facilitate explanations, the present disclosure uses terms and names defined in 3rd Generation Partnership Project (3GPP) Long Term Evolution (LTE) standard. However, the present disclosure is not limited to those terms and names, and can be equally applied to a system conforming to other standards.

In the wireless communication system, to address inter-cell interference which can easily arise in an environment where a plurality of cells is populated, the coordinated transmission between multi-cell can be adopted. The coordinated transmission is a control scheme of base stations for coordinating mutual signal transmission to mitigate the inter-cell interference. The coordinated transmission can be referred to as Cooperative Multi-Point (CoMP). For the coordinated transmission, a function for coordinating resource scheduling between the base stations is required. That is, for the coordinated transmission, it is necessary to control which one of neighboring base stations sends a signal and which one does not send in a particular transmission interval (e.g., a frame, a subframe, a Physical Resource Block (PRB), a physical channel, etc.) and a particular subcarrier.

Figure 1:
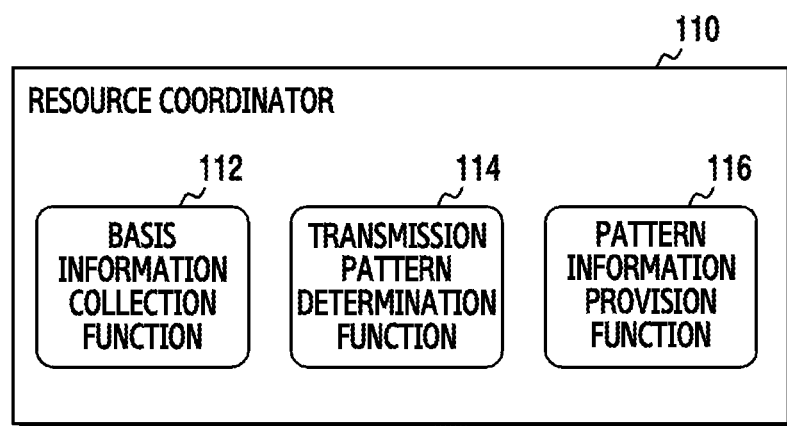
FIG. 1 depicts a functional entity for scheduling in a wireless communication according to an embodiment of the present disclosure.

FIG. 1 depicts a functional entity for scheduling in a wireless communication according to an embodiment of the present disclosure. Hereafter, the functional entity is referred to as a resource coordinator 110. For the coordinated transmission, the resource coordinator 110 can control resource use between a plurality of base stations. For doing so, the resource coordinator 110 can include a basis information collection function 112, a transmission pattern determination function 114, and a pattern information provision function 116.

According to the basis information collection function 112, the resource coordinator 110 collects control information used to schedule for the coordinated transmission. The control information can be provided from the base stations. For example, the control information can include at least one of values notifying whether downlink data of a scheduling unit or an information delivery period unit of the base stations is transmitted, and Channel State Information (CSI) of mobile stations accessing the base stations.

The values notifying whether the downlink data is transmitted can include downlink buffer occupancy information. That is, the values notifying whether the downlink data is transmitted can indicate whether there is buffered data to transmit in a corresponding schedule unit, that is, in each transmission interval or the whole time interval. Further, the values notifying whether the downlink data is transmitted can further include identification information of a destination mobile station of the buffered data. Whether the downlink is transmitted is presented with respect to a particular subcarrier or a bundle of a certain number of subcarriers.

The CSI can include at least one of Reference Signal Received Power (RSRP), uplink Sounding Reference Signal (SRS), power, Channel-Quality Indicator (CQI), Precoding Matrix Indicator (PMI), and Rank Indicator (RI). For doing so, the base stations can receive from the mobile station channel information measured based on Cell-specific Reference Signal (CRS) or Channel-State Information Reference Signal (CSI-RS), and send CSI generated from the received channel information to the resource coordinator 110. The CSI can be defined based on a magnitude of an interference signal and a noise against a serving signal. At this time, a neighboring base station included in an interference source of the interference signal can be selectively determined. When a multi-CSI feedback scheme is used, a plurality of CSIs can be provided.

According to the transmission pattern determination function 114, the resource coordinator 110 determines a transmission constraint or a utilization constraint for each of the base stations. The transmission constraint or the utilization constraint can be referred to as a transmission state. The transmission constraint indicates whether a corresponding base station can perform downlink transmission over a particular transmission interval. Hereafter, to facilitate explanations, a bundle of transmission constraints for the base stations is referred to as a transmission pattern. For example, the resource coordinator 110 can determine a transmission pattern which provides an optimal metric for the base stations on a schedule time unit (e.g., 1 ms). The transmission pattern can be performed on a minimum scheduling time unit (e.g., 1 ms) in the information delivery period or determined at least one time in the information delivery period.

According to the pattern information provision function 116, the resource coordinator 110 transmits scheduling information indicating the transmission constraints, that is, the transmission pattern for the base stations, to the base stations. The transmission pattern can indicate whether to allow the transmission per transmission interval of a certain time range. For example, the scheduling information can include a bitmap. That is, the scheduling information can include the bitmap indicating whether to allow the transmission per transmission interval and identification information of a corresponding base station. At this time, the transmission pattern can indicate whether to allow the transmission with respect to a particular subcarrier or a bundle of a certain number of subcarriers. Accordingly, when the transmission pattern differs per subcarrier, the scheduling information can include a plurality of transmission patterns corresponding to one base station. Further, the scheduling information can include information (e.g., subframe number and subframe number) notifying from when the transmitted transmission pattern is effective. The transmission pattern can be referred to as a COMP hypothesis.

The resource coordinator 110 can be implemented as the single physical component or distributed to the base stations. A case where the resource coordinator 110 is implemented as the single component is described in FIG. 2, and a case where the resource coordinator 110 is distributed is described in FIG. 3.

Figure 2:
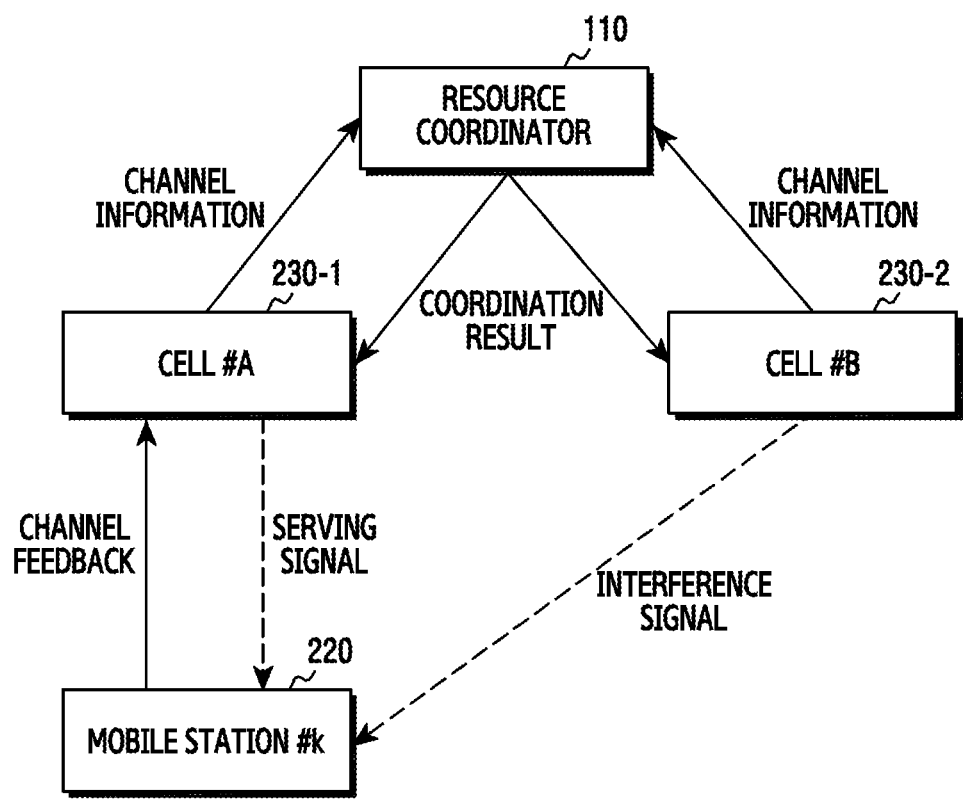
FIG. 2 depicts a system configuration for centric scheduling in a wireless communication according to an embodiment of the present disclosure.

FIG. 2 depicts a system configuration for centric scheduling in a wireless communication according to an embodiment of the present disclosure. FIG. 2 illustrates a case where the resource coordinator 110 is functionally separated from base stations.

Referring to FIG. 2, a mobile station #k 220, which is connected to a cell #A 230-1, receives a serving signal from the cell #A 230-1 and receives an interference signal from a neighboring cell #B 230-2. The mobile station #k 220 sends a channel feedback to the cell #A 230-1. The channel feedback is generated by the mobile station #k 220 attached to the cell #A 230-1, and can include channel information in consideration of the cell #B 230-2. In other words, the channel feedback can be generated based on measurement of the serving signal and the interference signal. A specific configuration of the channel information can be determined by the cell #A 230-1.

The cell #A 230-1 transmits channel information to the resource coordinator 110. The channel information includes the channel feedback received from the mobile station #k 220 or information processed based on the channel feedback. Also, the cell #B 230-2 transmits channel information received from a mobile station attached to the cell #B 230-2, to the resource coordinator 110. Hence, the resource coordinator 110 sends a coordination result to the cell #A 230-1 and the cell #B 230-2. In other words, the resource coordinator 110 transmits scheduling information including a transmission pattern for the cell #A 230-1 and the cell #B 230-2.

Figure 3:
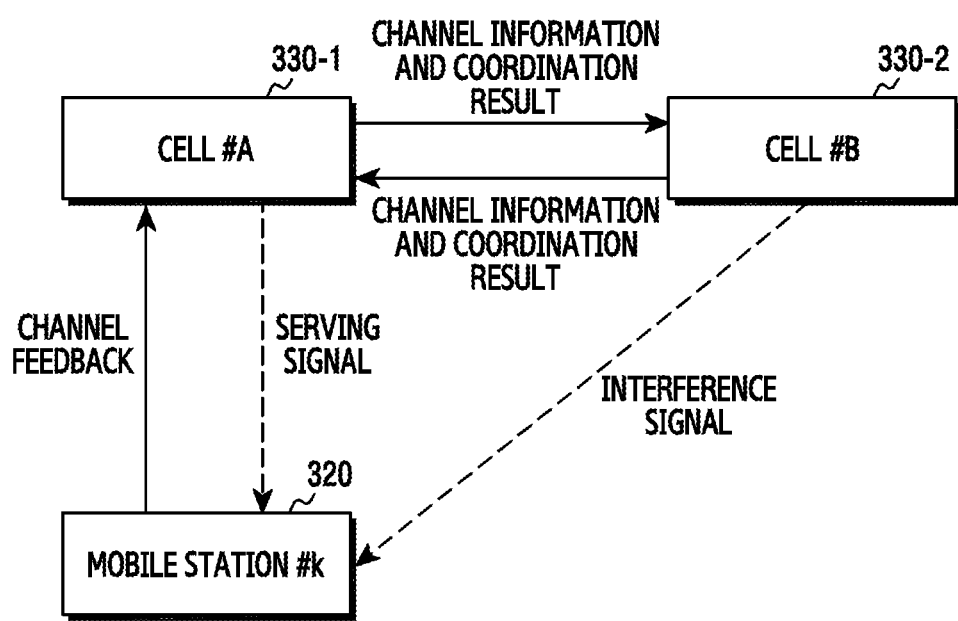
FIG. 3 depicts a system configuration for distributed scheduling in a wireless communication according to an embodiment of the present disclosure.

FIG. 3 depicts a system configuration for distributed scheduling in a wireless communication according to an embodiment of the present disclosure. FIG. 3 illustrates a case where the resource coordinator 110 is functionally distributed.

Referring to FIG. 3, a mobile station #k 320, which is connected to a cell #A 330-1, receives a serving signal from the cell #A 330-1 and receives an interference signal from a neighboring cell #B 330-2. The mobile station #k 320 sends a channel feedback to the cell #A 330-1. The channel feedback is generated by the mobile station #k 320 attached to the cell #A 330-1, and can include channel information in consideration of the cell #B 330-2. In other words, the channel feedback can be generated based on measurement of the serving signal and the interference signal. A specific configuration of the channel information can be determined by the cell #A 330-1.

Contrary to the example of FIG. 2, since the resource coordinator 110 is not implemented separately, the cell #A 330-1 determines a coordination result, that is, a transmission pattern of the cell #A 330-1 and transmits channel information and the coordination result to the neighboring cell #B 330-2. Likewise, the cell #B 330-2 determines a coordination result, that is, a transmission pattern of the cell #B 330-2 and transmits channel information and the coordination result to the neighboring cell #A 330-1. That is, the cell #A 330-1 and the cell #B 330-2 conduct part of functions of the resource coordinator 110. In other words, the cell #A 330-1 and the cell #B 330-2 function as the resource coordinator 110 for themselves, and mutually exchange scheduling information including the determined transmission pattern.

The resource coordinator 110 can be functionally independent from the base station as shown in FIG. 2, or distributed to the base stations as shown in FIG. 3. Further, when the resource coordinator 110 is functionally independent, the resource coordinator 110 can be implemented as an independent network entity, part of the base station, or a dummy base station. In the following, FIG. 4, FIG. 5, and FIG. 6 illustrate respective cases.

Figure 4:
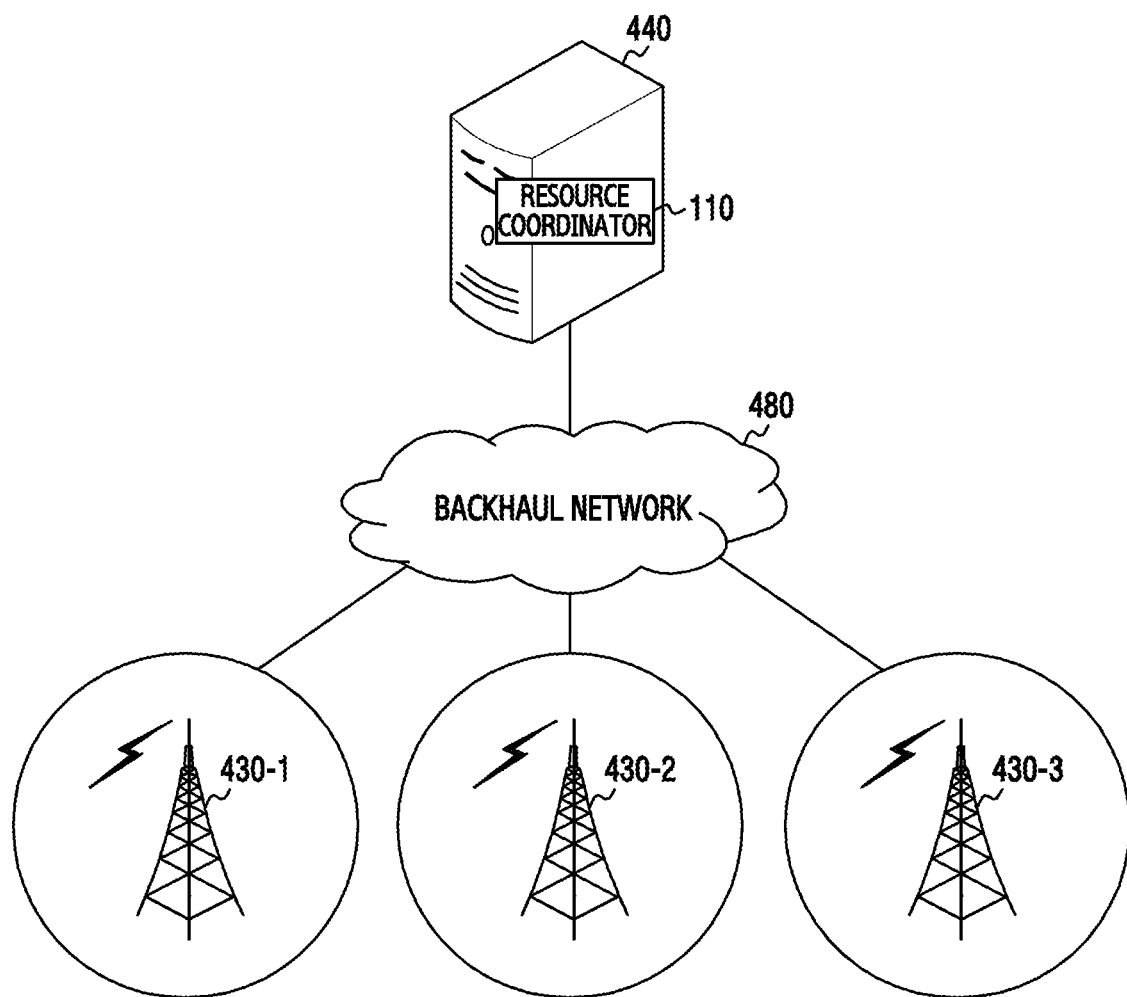
FIG. 4 depicts an example of an implementation of a resource coordinator in a wireless communication system according to an embodiment of the present disclosure.

FIG. 4 depicts an example of an implementation of a resource coordinator 110 in a wireless communication system according to an embodiment of the present disclosure. Referring to FIG. 4, the resource coordinator 110 is configured as a separate network entity 440. Herein, the network entity 440 can be referred to as a resource coordination server, a coordinated transmission server, and the like. The network entity 440 receives basis information from a plurality of base stations 430-1 through 430-3 via a backhaul network 480, determines a transmission pattern of the base stations 430-1 through 430-3, and transmits scheduling information including the transmission pattern.

Figure 5:
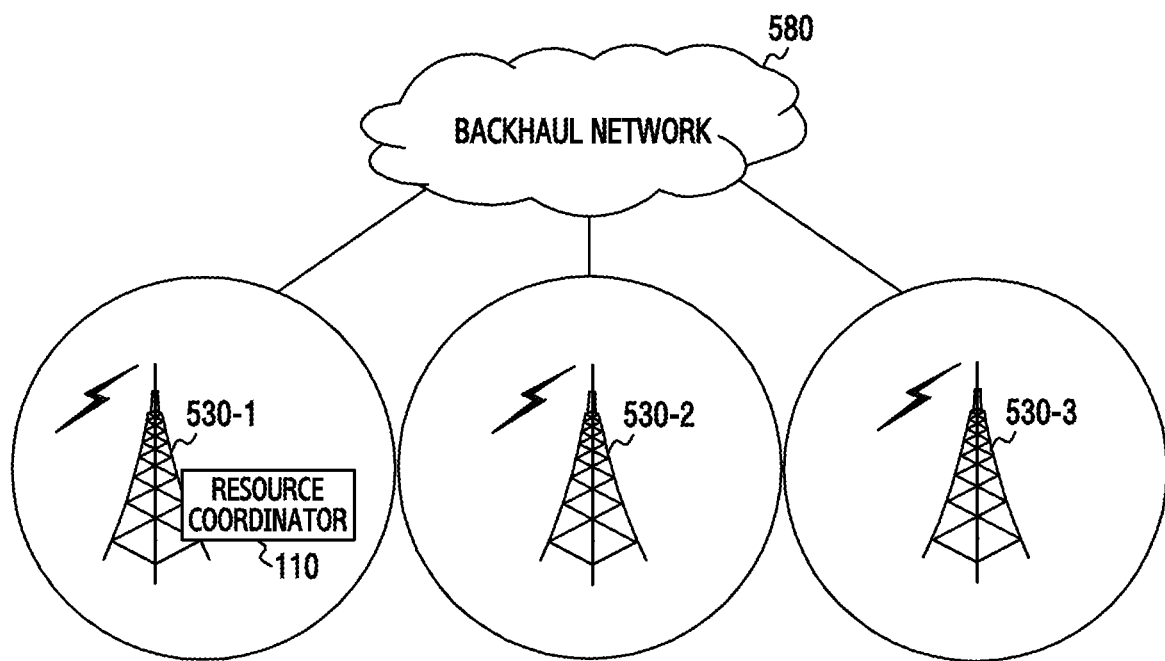
FIG. 5 depicts another example of an implementation of a resource coordinator in a wireless communication system according to an embodiment of the present disclosure.

FIG. 5 depicts an example of an implementation of a resource coordinator 110 in a wireless communication system according to an embodiment of the present disclosure. Referring to FIG. 5, the resource coordinator 110 is included as a part of a base station A 530-1 which is one of base stations 530-1 through 530-3. Thus, the base station A 530-1 receives basis information from the other base stations 530-2 and 530-3 via a backhaul network 580, determines a transmission pattern of the base stations 530-1 through 530-3 including itself, and transmits scheduling information including the transmission pattern.

Figure 6:
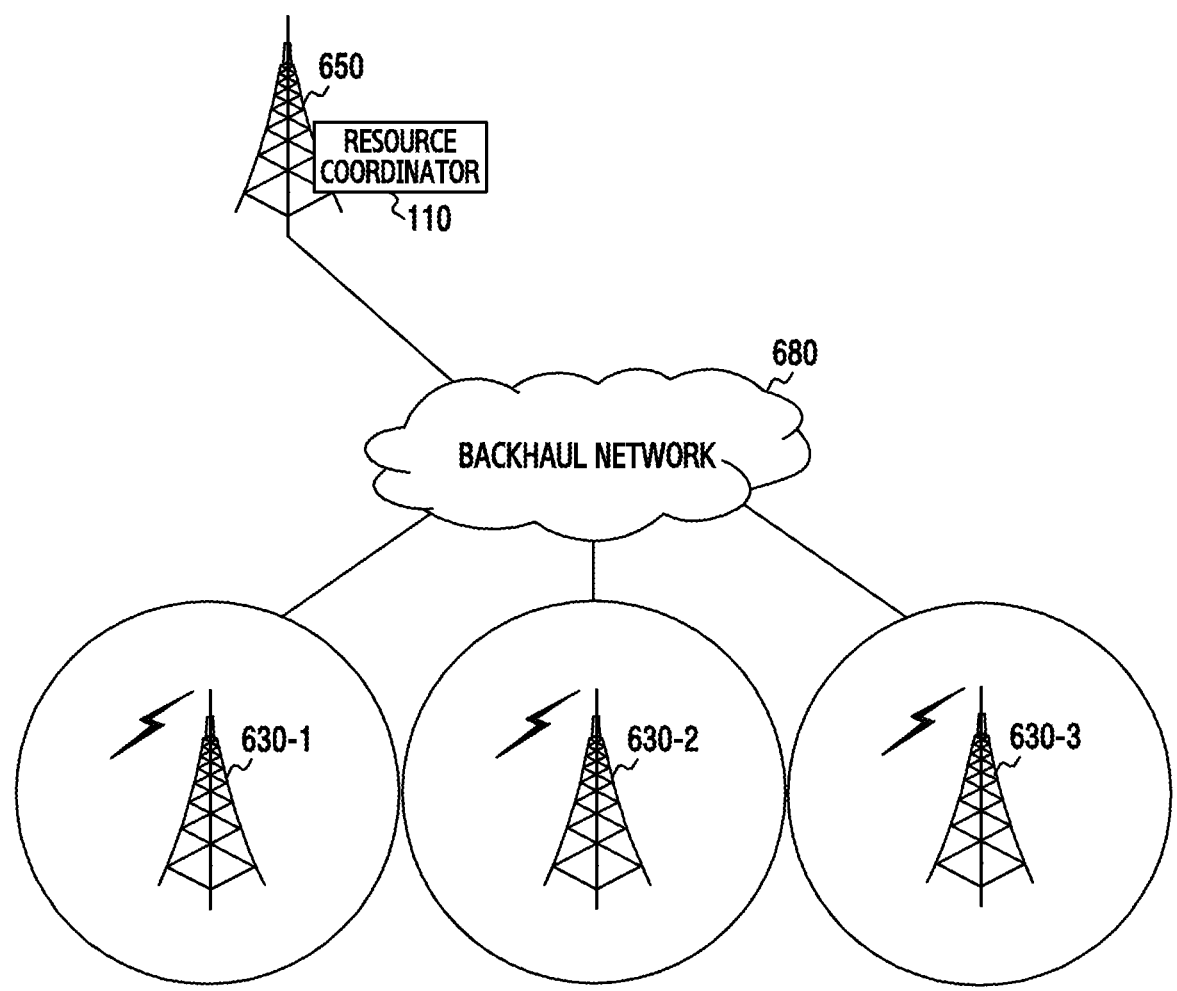
FIG. 6 depicts yet another example of an implementation of a resource coordinator in a wireless communication system according to an embodiment of the present disclosure.

FIG. 6 depicts an example of an implementation of a resource coordinator 110 in a wireless communication system according to an embodiment of the present disclosure. Referring to FIG. 6, the resource coordinator 110 can be configured as part of a dummy station 650. Unlike other base stations 630-1 through 630-3, the dummy base station 650 does not perform wireless communication with a mobile station and does not have a cell. The dummy base station 650 receives basis information from the base stations 630-1 through 630-3 via a backhaul network 680, determines a transmission pattern of the base stations 630-1 through 630-3, and transmits scheduling information including the transmission pattern.

Various embodiments of the present disclosure illustrate the system where the base station, the mobile station functionally connected to the base station, and the resource coordinator 110 supporting the cooperative communication between the base stations are functionally independent for the sake of the cooperative communication. As the resource coordinator 110 is adopted, the cooperative communication can be supported even in a system which uses an interface between the resource coordinator 110 and the base stations or an interface with transmission capacity limited by transmission delay between the base stations participating in the cooperative communication.

Figure 7:
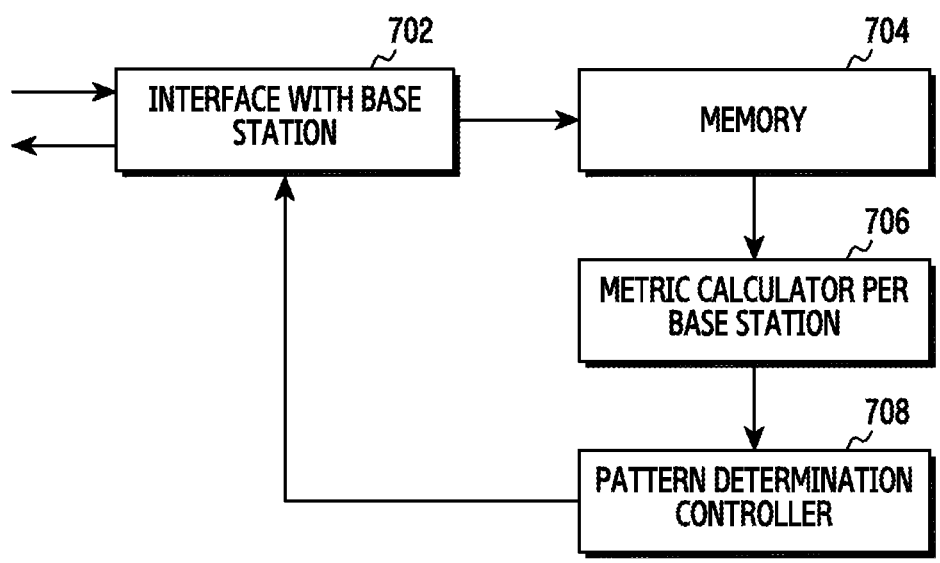
FIG. 7 depicts a block diagram of a resource coordinator in a wireless communication system according to an embodiment of the present disclosure.

FIG. 7 depicts a block diagram of a resource coordinator 110 in a wireless communication system according to an embodiment of the present disclosure. FIG. 7 illustrates a case where the resource coordinator 110 is functionally independent.

Referring to FIG. 7, the resource coordinator 110 includes an interface 720 with a base station, a memory 704, a metric calculator 706 per base station, and a pattern determination controller 708.

The interface 720 with the base station provides a signal processing function to communicate with base stations respectively. The interface 720 with the base station can perform conversion between a physical signal and data bits transmitted and received via a backhaul network. That is, the interface 720 with the base station can include a modem for accessing the backhaul network. Alternatively, when the resource coordinator 110 is included in part of one of the base stations, the interface 720 with the base station can include a physical means (e.g., a port) for accessing an internal data path (e.g., bus) of a Digital Unit (DU) of the base station.

The memory 704 stores setting information required to schedule the coordinated transmission, measurement information, control information, and temporary information. For example, the memory 704 stores control information received from the base stations, intermediate data generated to determine a transmission pattern, and data indicating the transmission pattern. The information stored in the memory 704 can be provided to the metric calculator 706 per base station.

The metric calculator 706 per base station determines metrics per base station to determine the transmission pattern. At least one metric can be determined per base station. In so doing, the metrics can be determined for all of the base stations, or for some base stations. The metric is used to determine whether to allow the transmission of at least one base station. According to various embodiments of the present disclosure, the metric can be defined in various forms. For example, the metric can be defined as a Proportional Fair (PF) metric. Specifically, one metric can be determined for one base station pair. For example, a metric of a second base station for a first base station can be defined as a gain of the second base station when the first base station aborts its transmission in a particular transmission interval. In this case, the metric of the second base station can be defined as a function of a channel gain of a mobile station obtaining a maximum channel gain among mobile stations attached to the second base station. At this time, a plurality of candidate transmission patterns can be generated according to a transmission constraint of each base station, and the metric per base station can be determined with respect to each of the candidate transmission patterns.

The pattern determination controller 708 determines the transmission pattern based on the metrics of the base stations determined by the metric calculator 706 per base station. That is, the pattern determination controller 708 determines a final transmission pattern among the candidate transmission patterns. The candidate transmission pattern having the maximum sum of the metrics of all the base stations can be selected as the final transmission pattern.

In the above-stated structure of the resource coordinator 110, the resource coordinator receives the control information from the base stations through the interface 702 with the base station. The control information includes necessary control information to determine transmission constraints or transmission states, that is, a transmission pattern of the base stations. According to an embodiment of the present disclosure, the control information includes information about a buffering state of downlink data of the base station and information about a channel state of the mobile stations attached to the base station. In the following, to ease explanations, the buffering state information of the downlink data is referred to as buffer occupancy state information, and the channel state information is referred to as CSI.

Figure 8:
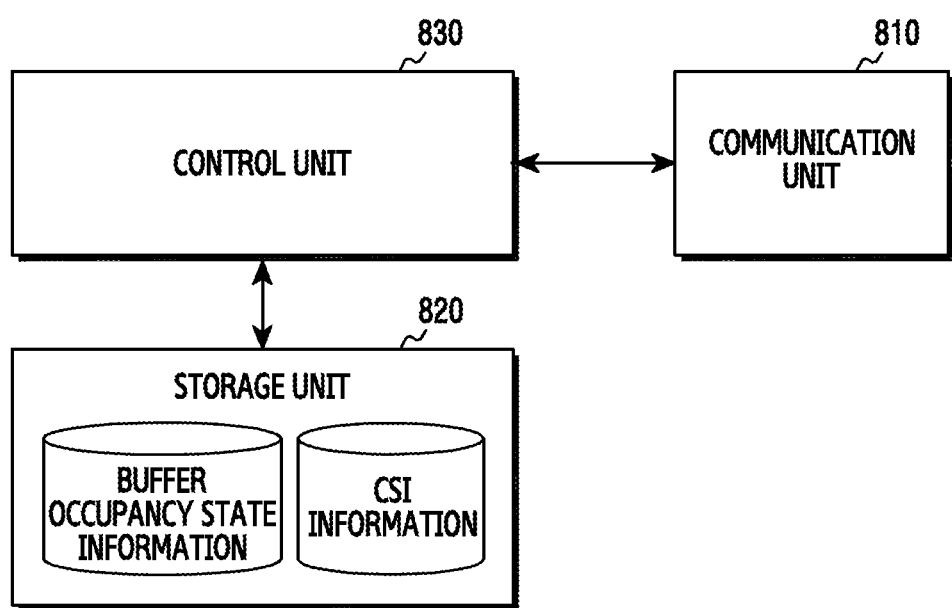
FIG. 8 depicts a block diagram of an apparatus functioning as a resource coordinator in a wireless communication system according to an embodiment of the present disclosure.

FIG. 8 depicts a block diagram of an apparatus for executes functions of a resource coordinator in a wireless communication system according to an embodiment of the present disclosure.

As shown in FIG. 8, the apparatus includes a communication unit 810, a storage unit 820, and a control unit 830.

The communication unit 810 provides an interface for communicating with other entities in a network. That is, the communication unit 810 converts a bit string transmitted from the apparatus to other entity, for example, to a base station, to a physical signal, and converts a physical signal received from the other entity to a bit string. That is, the communication unit 810 can transmit and receive signals. Hence, the communication unit 810 can be referred to as a transmitting unit, a receiving unit, or a transceiving unit.

The storage unit 820 stores a basic program for operating the apparatus, an application program, and data such as setting information. In particular, the storage unit 820 stores buffer occupancy state information received from base stations and CSI information of mobile stations. The buffer occupancy state information is information notifying whether there is buffered data to send in a scheduling unit, that is, in each transmission interval or the whole time interval. Alternatively, the buffer occupancy state information can include a ratio of the transmission interval having the buffered data against the whole time interval. Further, the buffer occupancy state information can further include identification information of a destination mobile station of the buffered data. Also, the CSI is based on a power of an interference signal and a noise against a serving signal. Specifically, the CSI can include at least one of RSRP, uplink SRS power, CQI, PMI, and RI. The storage unit 820 provides the stored data according to a request of the control unit 830.

The control unit 830 controls general operations of the apparatus. For example, the control unit 830 transmits and receives signals through the communication unit 810. Also, the control unit 830 records and reads data to and from the storage unit 820. According to an embodiment of the present disclosure, the control unit 830 can determine the transmission pattern of the base stations to conduct the coordinated transmission. The operations of the control unit 830 according to an embodiment of the present disclosure are as follows.

According to an embodiment of the present disclosure, the control unit 830 receives the buffer occupancy state information of the base stations and the CSI of the mobile stations attached to the base stations through the communication unit 810. The control unit 830 determines the transmission pattern of the base stations based on the buffer occupancy state information. For doing so, the apparatus identifies at least one base station not needing data transmission, and sets the transmission constraint of the identified at least one base station to transmission off. The apparatus determines whether each base station requests the transmission off from the other base stations, and sets a transmission constraint of at least one base station having no transmission off request, to transmission on. Next, the apparatus generates candidate transmission patterns corresponding to combinations of the transmission constraints of one or more base stations with the underdetermined transmission constraint, and selects one candidate transmission pattern having a maximum gain sum of the base station, as a final transmission pattern. Next, the control unit 830 can send the transmission pattern to the base stations through the communication unit 810.

Figure 9:
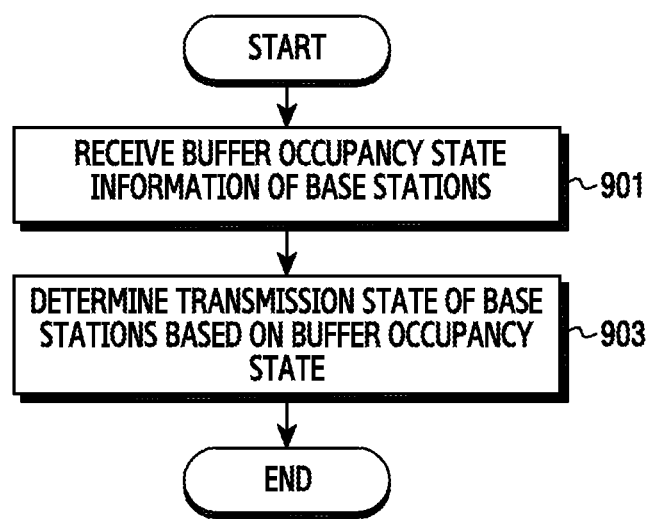
FIG. 9 depicts operations of an apparatus functioning as a resource coordinator in a wireless communication system according to an embodiment of the present disclosure.

FIG. 9 depicts an operating process of an apparatus for functioning as a resource coordinator 110 in a wireless communication system according to an embodiment of the present disclosure. FIG. 9 illustrates a method for receiving control information and determining a transmission pattern. The apparatus can be a separate entity which functions as the resource coordinator 110 or a base station which functions as the resource coordinator 110.

Referring to FIG. 9, the apparatus receives buffer occupancy state information of base stations in step 901. The buffer occupancy state information is information notifying whether there is buffered data to transmit in a scheduling unit, that is, in each transmission interval or the whole time interval. Alternatively, the buffer occupancy state information can include a ratio of the transmission interval having the buffered data against the whole time interval. Further, the buffer occupancy state information can further include identification information of a destination mobile station of the buffered data. Also, in addition to the buffer occupancy state information, the apparatus can further receive CSI of at least one mobile station. The CSI is based on a power of an interference signal and a noise against a serving signal. Specifically, the CSI can include at least one of RSRP, uplink SRS power, CQI, PMI, and RI.

Next, the apparatus determines a downlink transmission state per transmission interval of the base stations based on the buffer occupancy state information in step 903. That is, the apparatus determines downlink transmission of the base stations, that is, schedules the downlink transmission. In other words, the apparatus determines a transmission pattern of the base stations. For doing so, the apparatus can use the buffer occupancy state information. Specifically, the apparatus can identify at least one base station not needing data transmission, and set the transmission constraint of the identified at least one base station to transmission off. The apparatus determines whether each base station requests the transmission off from the other base stations, and sets a transmission constraint of at least one base station having no transmission off request, to transmission on. Next, the apparatus generates candidate transmission patterns corresponding to combinations of the transmission constraints of at least one base station with the underdetermined transmission constraint, and selects one candidate transmission pattern having a maximum gain sum of the base station, as a final transmission pattern.

Although not depicted in FIG. 9, scheduling information including the transmission pattern finally determined is transmitted to each base station, and each base station sets the transmission state to on or off in the transmission interval defined for the other base stations according to the transmission pattern. Thus, each base station can select a transmission mobile station according to an individual transmission mobile station selection metric, and determine a modulation and a coding level so send a data rate based on interference.

According to various embodiments of the present disclosure, the buffer occupancy state information and the CSI can be configured in various forms. The buffer occupancy state information and the CSI can be configured as shown in FIG. 10, FIG. 11, FIG. 12, or FIG. 13. In the following, FIG. 10, FIG. 11, FIG. 12, and FIG. 13 illustrate a case where control information of five transmission intervals includes one feedback information.

Figure 10:
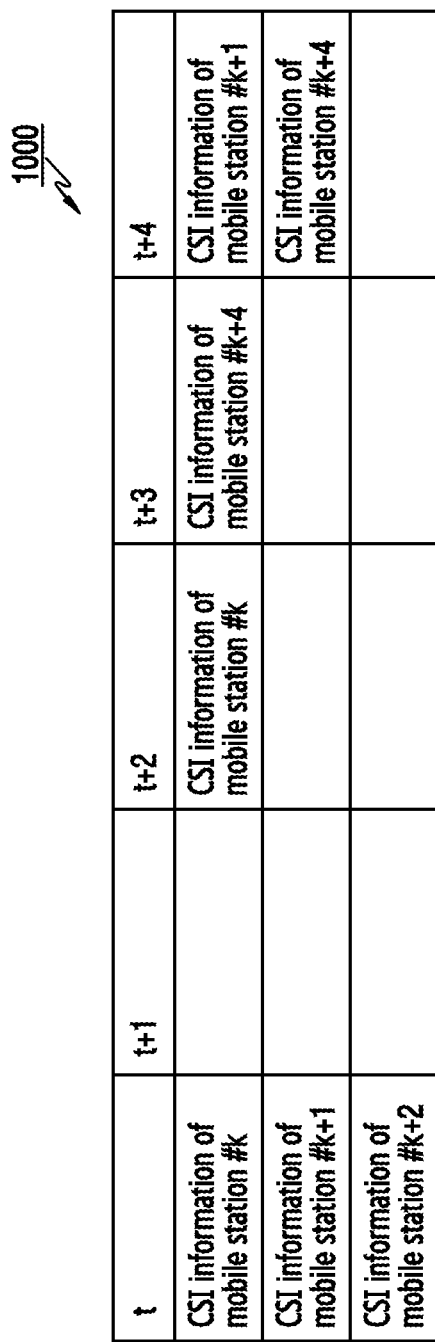
FIG. 10 depicts an example of control information provided to a resource coordinator in a wireless communication system according to an embodiment of the present disclosure.

FIG. 10 depicts an example of control information provided to a resource coordinator 110 in a wireless communication system according to an embodiment of the present disclosure. Referring to FIG. 10, the control information can include pairs 1000 of identification information and CSI of a destination mobile station of buffered data per transmission interval (e.g., frame, subframe). the example of FIG. 10 presents, in the transmission interval t, data transmission required by a mobile station #k, a mobile station #k+1, and a mobile station #k+2, and CSI of the mobile station #k, CSI of mobile station #k+1, and CSI of the mobile station #k+2 at a corresponding time point. Also, in the transmission interval t+1, no mobile stations require the data transmission. Also, in the transmission interval t+2, data transmission required by the mobile station #k and the CSI of the mobile station #k at a corresponding time point are presented. Also, in the transmission interval t+3, data transmission required by the mobile station #k+4 and the CSI of the mobile station #k+4 at a corresponding time point are presented. Also, in the transmission interval t+4, data transmission required by the mobile station #k+1 and the mobile station #k+4 and the CSI of the mobile station #k+1 and the CSI of the mobile station #k+4 at a corresponding time point are presented.

FIG. 11 depicts another example of control information provided to a resource coordinator 110 in a wireless communication system according to an embodiment of the present disclosure. Referring to FIG. 11, the control information can include identification information 1102 of destination mobile stations of buffered data per (e.g., frame, subframe) and a CSI list 1104 of mobile stations. The CSI list 1104 can include CSI of destination mobile stations of downlink transmit data generated in a transmission interval of the control information, or CSI of CSI-updated mobile stations in the transmission interval of the control information regardless of the downlink transmission data. In the example of FIG. 11, the identification information 1102 represents that a mobile station #k, a mobile station #k+1, and a mobile station #k+2 does not need data transmission in the transmission interval t, no mobile stations require data transmission in the transmission interval t+1, the mobile station #k requires data transmission in the transmission interval t+2, the mobile station #k+4 requires data transmission in the transmission interval t+3, and the mobile station #k+1 and the mobile station #k+4 require data transmission in the transmission interval t+4. The CSI list 1104 represents CSI of the mobile station #k, CSI of the mobile station #k+1, CSI of the mobile station #k+2, and CSI of the mobile station #k+4. Herein, the CSI is a representative value for the transmission interval, and can be an average value of last values reported, a value of a particular transmission interval, or a maximum value or a minimum value.

The resource coordinator 110 receiving the control information of FIG. 10 or FIG. 11 from the base stations can determine a transmission constraint of each base station and whether to use it on the transmission interval unit based on the control information. In so doing, the CSI can be used for the mobile station of each base station to predict interference from a neighboring base station and a gain in interference control. Mobile station information and a mobile station list transmitted repeatedly can be used to predict a resource amount to send to each mobile station and a resource amount to be transmitted by the base station.

The resource coordinator 110 determines a resource constraint result by considering the neighboring base station interference control gain and the resource amount of the mobile stations. To generate the resource constraint result determined by the resource coordinator 110, a virtual scheduling method for optimizing a sum of metrics (e.g., PF metrics) of all the base stations can be used.

The resource constraint result can be configured as a bitmap and shared with each base station. In the centric scheme, the constraint result sent to one base station, that is, the transmission pattern includes the constraint result of neighboring base stations, is distinguished per application time according to a transmission period, and thus can be carried by one message according to the period.

FIG. 12 depicts yet another example of control information provided to a resource coordinator 110 in a wireless communication system according to an embodiment of the present disclosure. Referring to FIG. 12, the control information can include information 1206 of whether there is at least one mobile station requiring data transmission per transmission interval and a CSI list 1204. The example of FIG. 12 represents that at least one mobile station requires the data transmission in the transmission interval t, no mobile station requires the data transmission in the transmission interval t+1, at least one mobile station requires the data transmission in the transmission interval t+2, no mobile station requires the data transmission in the transmission interval t+3, and no mobile station requires the data transmission in the transmission interval t+4. The CSI list 1204 represents the CSI of mobile stations. Herein, the CSI is a representative value for the transmission interval, and can be a last value reported, an average value, a value of a particular transmission interval, or a maximum value or a minimum value.

Figure 13:
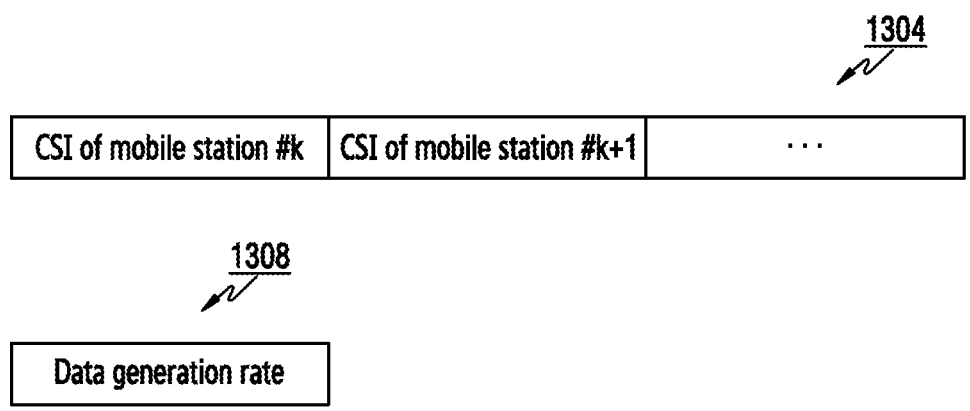
FIG. 13 depicts still another example of control information provided to a resource coordinator in a wireless communication system according to an embodiment of the present disclosure.

FIG. 13 depicts still another example of control information provided to a resource coordinator 110 in a wireless communication system according to an embodiment of the present disclosure. Referring to FIG. 13, the control information can include a CSI list 1304 of mobile stations requiring data transmission over transmission intervals, and a data generation rate 1308 of a base station for the transmission intervals. The CSI list 1304 represents CSI of mobile stations. The data generation rate 1308 indicates a rate of an interval where at least one mobile station requires the data transmission among the transmission intervals. For example, in FIG. 13, the data generation rate 1308 is ⅖, that is, 40%. The data generation rate 1308 can be referred to as a busy ratio.

Based on the above-stated control information, the resource coordinator 110 can determine a transmission pattern, that is, transmission states for base stations participating in coordinated transmission. The transmission pattern indicates whether to constrain the transmission of each of the base stations, that is, indicates the transmission state on or the transmission state off. Accordingly, when the number of the base stations is N, one of $2^N$-ary transmission patterns can be selected. On/off can be expressed with one bit, and in this case, the transmission pattern can be configured as a bitmap. A location of each bit is mapped to each base station, and has a value of 1 or 0. Herein, the transmission pattern can indicate the transmission state for one subcarrier or a bundle of a certain number of subcarriers. An example of the transmission pattern is shown in Table 1.

TABLE 1

| base station #1 | base station #2 | base station #3 | base station #4 | . . . | base station #N |
| --- | --- | --- | --- | --- | --- |
| 0 | 0 | 1 | 0 | . . . | 1 |

Table 1 shows a transmission pattern for N-ary base stations. When the transmission off is expressed as '0' and the transmission on is expressed as '1', the transmission pattern of Table 1 shows that the transmission off of the base station #1, the transmission off of the base station #2, the transmission off of the base station #4, the transmission on of the base station #3, and the transmission on of the base station #N.

The transmission pattern can be determined per transmission interval. Herein, the transmission interval for the transmission pattern and the transmission interval of control information transmitted by the base stations can be the same or different from each other. For example, the unit of the transmission interval for the control information is one subframe, and the unit of the transmission interval for the transmission pattern can be a plurality of subframes. Herein, the subframes can be a frame or a superframe.

The unit of the transmission interval for the control information and the unit of the transmission interval for the transmission pattern are the same, the resource coordinator 110 can receive control information for five transmission intervals from base stations and determine transmission patterns for the five transmission intervals. In so doing, to determine the transmission pattern of the first transmission interval, buffer occupancy state information and CSI of the first transmission interval included in the control information can be used.

Figure 14:
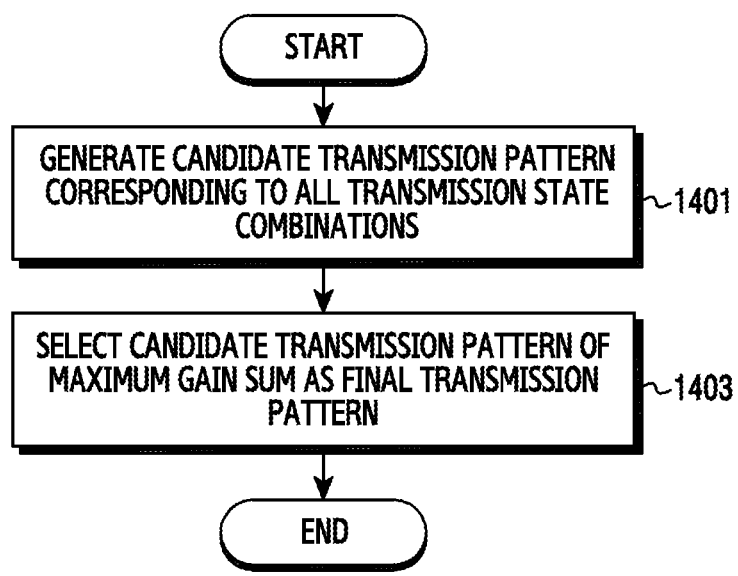
FIG. 14 depicts a transmission pattern determining procedure of a resource coordinator in a wireless communication system according to an embodiment of the present disclosure.

FIG. 14 depicts a transmission pattern determining procedure of a resource coordinator 110 in a wireless communication system according to an embodiment of the present disclosure. FIG. 14 illustrates an operating method of an apparatus functioning as the resource coordinator 110.

Referring to FIG. 14, next, the resource coordinator 110 generates candidate transmission patterns corresponding to all transmission state combinations of base stations which provide control information in step 1401. When the number of the base stations is $2^m$-ary candidate transmission patterns can be generated.

Next, the resource coordinator 110 selects the candidate transmission pattern of the maximum gain sum as a final transmission pattern in step 1403. When a transmission state of any one base station is off, a gain of a mobile station interfered by the base station increases. Accordingly, the resource coordinator 110 calculates a gain of the base station from the gain of mobile stations, and selects the candidate transmission pattern which maximizes a gain sum per base station, as the final transmission pattern.

Figure 15:
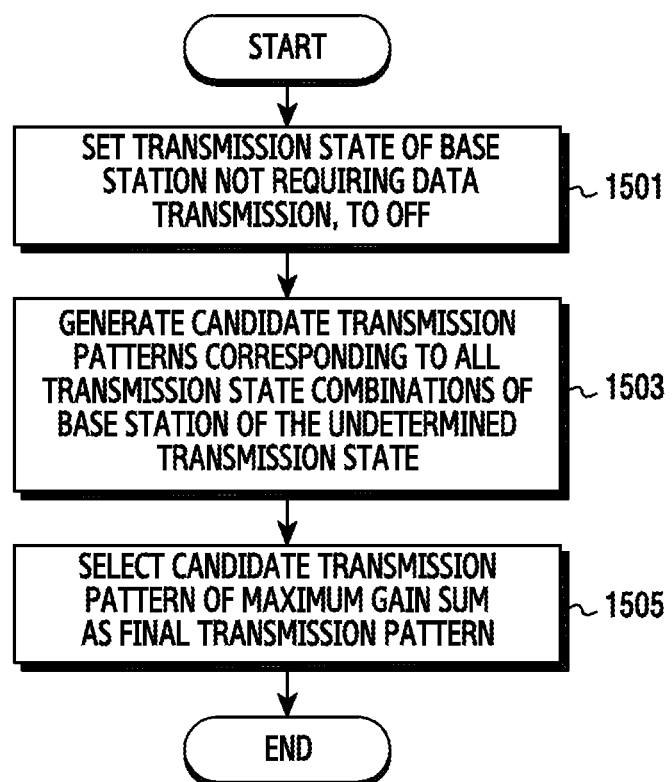
FIG. 15 depicts a transmission pattern determining procedure of a resource coordinator in a wireless communication system according to another embodiment of the present disclosure.

FIG. 15 depicts a transmission pattern determining procedure of a resource coordinator 110 in a wireless communication system according to another embodiment of the present disclosure. FIG. 15 illustrates an operating method of an apparatus functioning as the resource coordinator 110.

Referring to FIG. 15, the resource coordinator 110 sets a transmission state of at least one base station not requiring data transmission, to off in step 1501. Whether the data transmission is needed can be determined based on control information received from base stations. Yet, when there is no base station not requiring the data transmission, the step 1501 can be omitted.

Next, the resource coordinator 110 generates candidate transmission patterns corresponding to all transmission state combinations of at least one base station of which the transmission state is not determined, in step 1503. When the number of the at least one base station of the undetermined transmission state is $2^m$-ary candidate transmission patterns can be generated. Yet, when there is no base station of the undetermined transmission state, the step 1503 can be omitted.

Next, the resource coordinator 110 selects the candidate transmission pattern of the maximum gain sum, as a final transmission pattern in step 1505. When the transmission state of any one base station is off, a gain of a mobile station interfered by the base station increases. Accordingly, the resource coordinator 110 calculates the gain of the base station from gains of mobile stations, and selects the candidate transmission pattern which maximizes the gain sum per base station, as the final transmission pattern.

Figure 16:
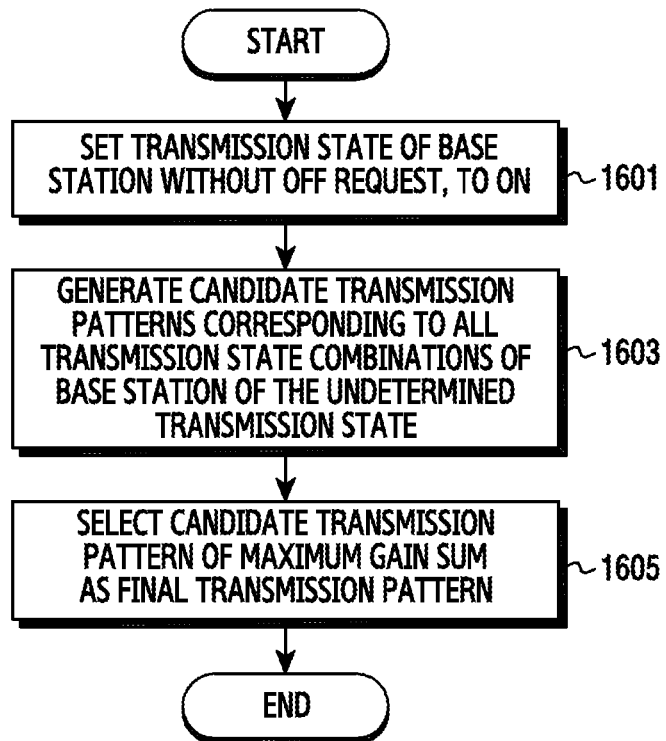
FIG. 16 depicts a transmission pattern determining procedure of a resource coordinator in a wireless communication system according to yet another embodiment of the present disclosure.

FIG. 16 depicts a transmission pattern determining procedure of a resource coordinator 110 in a wireless communication system according to yet another embodiment of the present disclosure. FIG. 16 illustrates an operating method of an apparatus functioning as the resource coordinator 110.

Referring to FIG. 16, the resource coordinator 110 sets a transmission state of at least one base station requiring no data transmission off, to on in step 1601. The off request can be determined based on CSI of mobile stations attached to other base station. Yet, when there is no base station requiring no off request, the step 1601 can be omitted.

Next, the resource coordinator 110 generates candidate transmission patterns corresponding to all transmission state combinations of at least one base station of which the transmission state is not determined, in step 1603. When the number of one or more base stations of the undetermined transmission state is m, $2^m$-ary candidate transmission patterns can be generated. Yet, when there is no base station with the undetermined transmission state, the step 1603 can be omitted.

Next, the resource coordinator 110 selects the candidate transmission pattern of the maximum gain sum as a final transmission pattern in step 1605. When the transmission state of any one base station is off, a gain of a mobile station interfered by the base station increases. Accordingly, the resource coordinator 110 calculates a gain of the base station from gains of mobile stations, and selects the candidate transmission pattern which maximizes a gain sum per base station, as the final transmission pattern.

Figure 17:
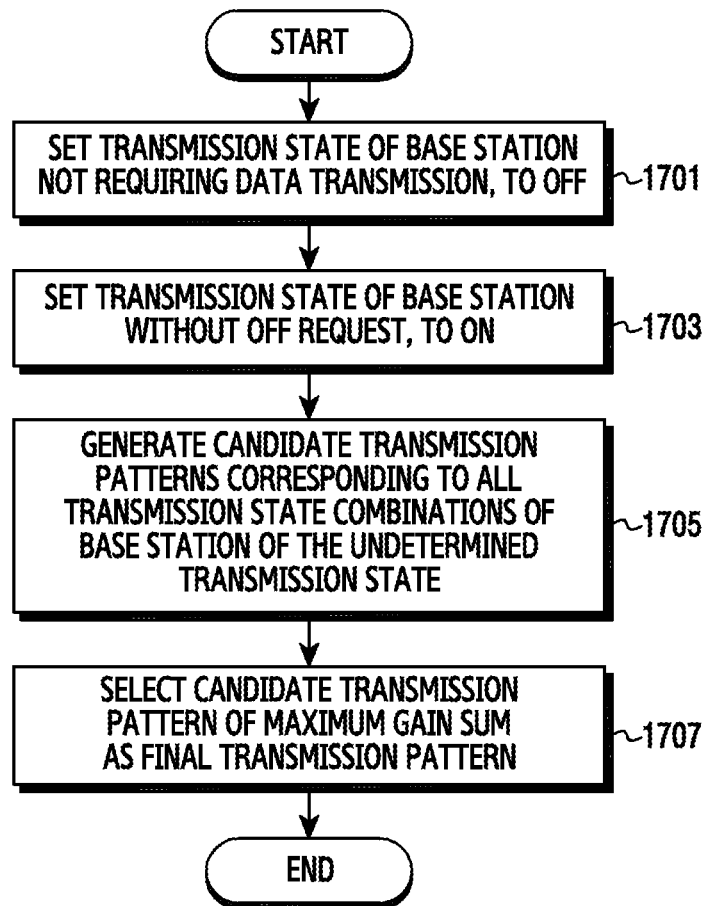
FIG. 17 depicts a transmission pattern determining procedure of a resource coordinator in a wireless communication system according to still another embodiment of the present disclosure.

FIG. 17 depicts a transmission pattern determining procedure of a resource coordinator 110 in a wireless communication system according to still another embodiment of the present disclosure. FIG. 17 illustrates an operating method of an apparatus functioning as the resource coordinator 110.

Referring to FIG. 17, the resource coordinator 110 sets a transmission state of at least one base station not requiring data transmission, to off in step 1701. Whether the data transmission is needed can be determined based on control information received from base stations. Yet, when there is no base station not requiring the data transmission, the step 1701 can be omitted.

Next, the resource coordinator 110 sets a transmission state of at least one base station requiring no off request, to on in step 1703. The off request can be determined based on CSI of mobile stations attached to other base station. Yet, when there is no base station requiring no off request, the step 1703 can be omitted.

Next, the resource coordinator 110 generates candidate transmission patterns corresponding to all transmission state combinations of at least one base station of which the transmission state is not determined, in step 1705. When the number of one or more base stations of the undetermined transmission state is m, $2^m$-ary candidate transmission patterns can be generated. Yet, when there is no base station of the undetermined transmission state, the step 1705 can be omitted.

Next, the resource coordinator 110 selects the candidate transmission pattern of the maximum gain sum as a final transmission pattern in step 1707. When the transmission state of any one base station is off, a gain of a mobile station interfered by the base station increases. Accordingly, the resource coordinator 110 calculates a gain of the base station from gains of mobile stations, and selects the candidate transmission pattern which maximizes the gain sum per base station, as the final transmission pattern.

Figure 18:
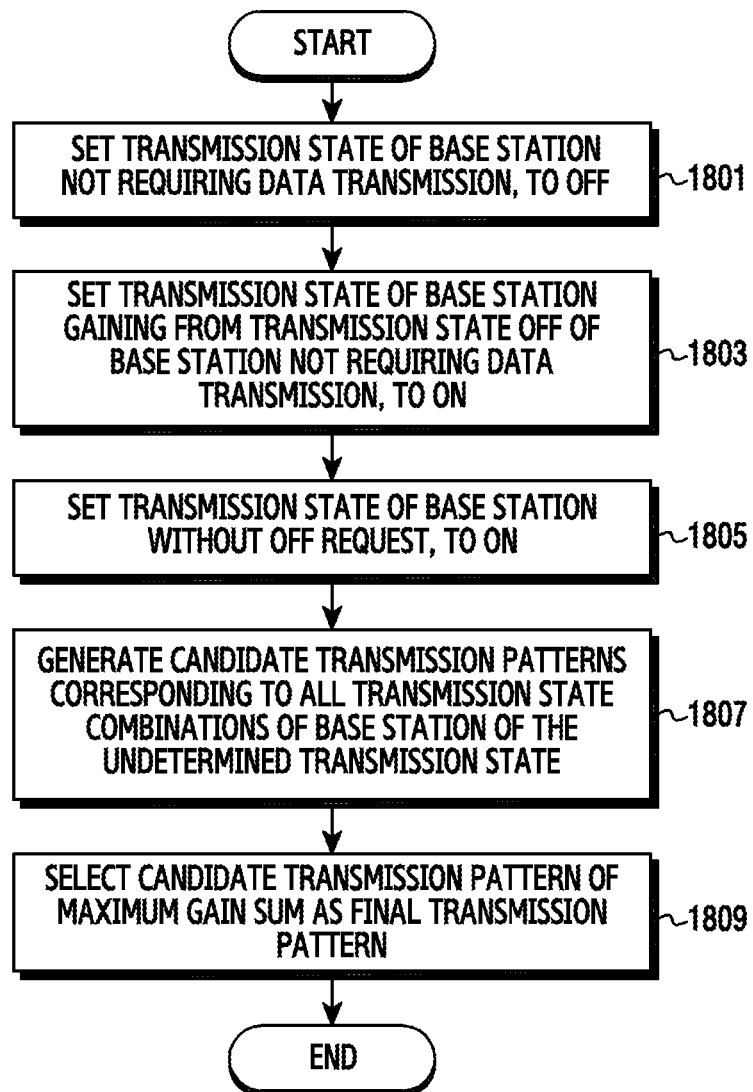
FIG. 18 depicts a transmission pattern determining procedure of a resource coordinator in a wireless communication system according to a further embodiment of the present disclosure.

FIG. 18 depicts a transmission pattern determining procedure of a resource coordinator 110 in a wireless communication system according to a further embodiment of the present disclosure. FIG. 18 illustrates an operating method of an apparatus functioning as the resource coordinator 110.

Referring to FIG. 18, the resource coordinator 110 sets a transmission state of at least one base station not requiring data transmission, to off in step 1801. Whether the data transmission is needed can be determined based on control information received from base stations. Yet, when there is no base station not requiring the data transmission, the step 1801 can be omitted.

Next, the resource coordinator 110 sets the transmission state of at least one base station gaining from the transmission state off of the base station not requiring the data transmission, to on in step 1803. That is, the resource coordinator 110 can first determine no transmission of a base station having no downlink mobile station resource using time unit information received from the base stations, and then identify a mobile station gaining from the base station not transmitting among neighboring base stations. In so doing, when there is the mobile station gaining from the base station not transmitting over a certain level, the resource coordinator 110 sets the transmission state of the base station attached with the mobile station, to on. Yet, when there is no base station not requiring the data transmission, the step 1803 can be omitted.

Next, the resource coordinator 110 sets a transmission state of at least one base station requiring no off request, to on in step 1805. The off request can be determined based on CSI of mobile stations attached to other base station. Yet, when there is no base station requiring no off request, the step 1805 can be omitted.

Next, the resource coordinator 110 generates candidate transmission patterns corresponding to all transmission state combinations of at least one base station of which the transmission state is not determined, in step 1807. When the number of one or more base stations of the undetermined transmission state is $2^m$-ary candidate transmission patterns can be generated. Yet, when there is no base station with the undetermined transmission state, the step 1807 can be omitted.

Next, the resource coordinator 110 selects the candidate transmission pattern of the maximum gain sum as a final transmission pattern in step 1809. When the transmission state of any one base station is off, a gain of a mobile station interfered by the base station increases. Accordingly, the resource coordinator 110 calculates the gain of the base station from gains of mobile stations, and selects the candidate transmission pattern which maximizes the gain sum per base station, as the final transmission pattern.

According to other embodiment of the present disclosure, the transmission pattern can be determined only based on whether there is downlink mobile station resource of the time unit transmitted from the base stations, that is, whether there is buffered data. In this case, the resource coordinator 110 can determine the transmission pattern as shown in FIG. 19.

Figure 19:
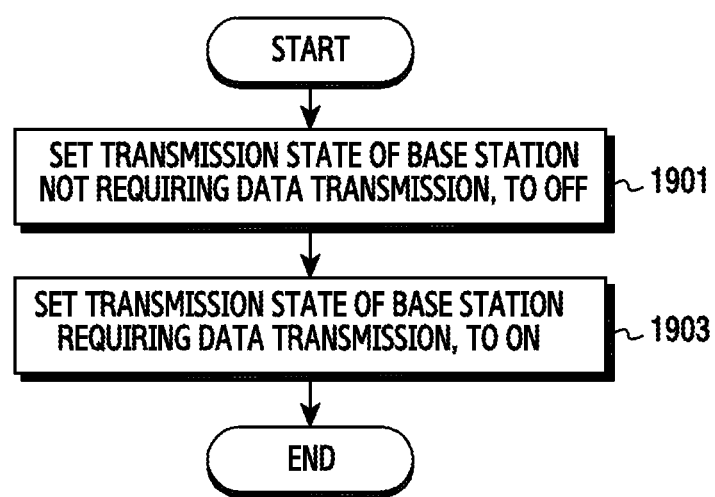
FIG. 19 depicts a transmission pattern determining procedure of a resource coordinator in a wireless communication system according to a further embodiment of the present disclosure.

FIG. 19 depicts a transmission pattern determining procedure of a resource coordinator 110 in a wireless communication system according to a further embodiment of the present disclosure. FIG. 19 illustrates an operating method of an apparatus functioning as the resource coordinator 110.

Referring to FIG. 19, the resource coordinator 110 sets a transmission state of at least one base station not requiring data transmission, to off in step 1901. In other words, the resource coordinator 110 can set the transmission state of the base station having no downlink mobile station resource, that is, having no buffered data, to off. Whether the data transmission is not needed can be determined based on control information received from base stations. Yet, when there is no base station not requiring the data transmission, the step 1901 can be omitted.

Next, the resource coordinator 110 sets a transmission state of at least one base station requiring data transmission, to on in step 1903. In other words, the resource coordinator 110 can set the transmission state of the base station having the downlink mobile station resource, that is, having the buffered data, to on. Yet, when there is no base station requiring the data transmission, the step 1903 can be omitted.

According to an embodiment of the present disclosure, the control information provided from the base stations are not configured on the scheduling time unit, but can be configured as the data generation rate as shown in FIG. 13. In this case, the resource coordinator 110 can determine the transmission pattern as shown in FIG. 20.

Figure 20:
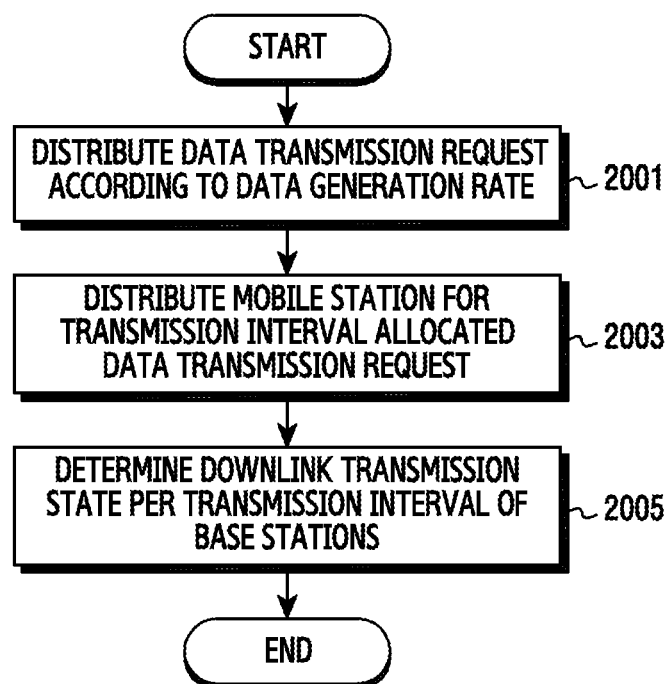
FIG. 20 depicts a transmission pattern determining procedure of a resource coordinator in a wireless communication system according to a further embodiment of the present disclosure.

FIG. 20 depicts a transmission pattern determining procedure of a resource coordinator 110 in a wireless communication system according to a further embodiment of the present disclosure. FIG. 20 illustrates an operating method of an apparatus functioning as the resource coordinator 110.

Referring to FIG. 20, the resource coordinator 110 distributes a data transmission request according to a data generation rate included in control information received from base stations in step 2001. In other words, the resource coordinator 110 distributes the data transmission request on a scheduling time unit within a transmission period so as to match the data generation rate. The data transmission request can be distributed according to a predefined rule. For example, when the data generation rate is 40% and the transmission period includes five transmission intervals, the resource coordinator 110 can distribute the data transmission request with respect to two of the five transmission intervals.

Next, the resource coordinator 110 distributes a mobile station for at least one transmission interval allocated the data transmission request in step 2003. In so doing, the mobile station can be selected in a corresponding transmission interval based on a random function or for every mobile station. In other words, at least one mobile station selected by the random function, or all of the mobile stations can be allocated to the transmission interval allocated the data transmission request.

Next, the resource coordinator 110 determines a downlink transmission state per transmission interval of the base stations in step 2005. That is, the resource coordinator 110 schedules the data transmission request per transmission interval generated from the data generation rate, that is, downlink transmission of the base stations based on buffer occupancy state information. In other words, the resource coordinator 110 determines the transmission pattern of the base stations.

According to a further embodiment of the present disclosure, the resource coordinator 110 can randomize time information of control information and determine an optimal metric sum regardless of time interval information. In other words, the resource coordinator 110 can rearrange a time order of the control information (e.g., the buffer occupancy state information and the CSI) per transmission interval included in the control information, based on the random function, and determine the transmission pattern. In this case, the resource coordinator 110 can determine the transmission pattern as shown in FIG. 21.

Figure 21:
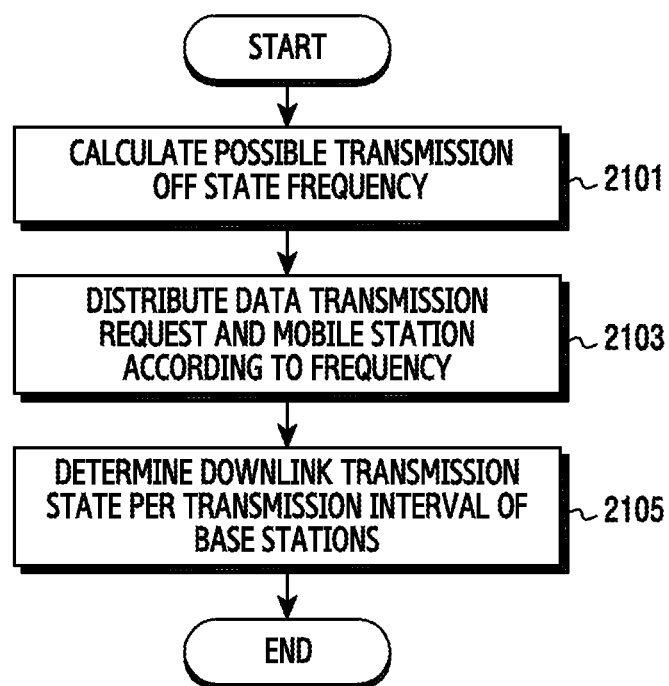
FIG. 21 depicts a transmission pattern determining procedure of a resource coordinator in a wireless communication system according to a further embodiment of the present disclosure.

FIG. 21 depicts a transmission pattern determining procedure of a resource coordinator 110 in a wireless communication system according to a further embodiment of the present disclosure. FIG. 21 illustrates an operating method of an apparatus functioning as the resource coordinator 110.

Referring to FIG. 21, the resource coordinator 110 calculates a possible transmission off state frequency of each base station from control information received per base station in step 2101. That is, the resource coordinator 110 rearranges a time order of the control information. In other words, the resource coordinator 110 does not arrange a buffer occupancy state of the control information according to a transmission interval, and converts to the possible off frequency. Hence, information identical or similar to the data generation rate 1108 can be generated. Thus, buffer occupancy state information per transmission interval received from the base station can be recombined.

Next, the resource coordinator 110 distributes a data transmission request according to a data generation rate included in control information received from base stations, and distributes a mobile station to a transmission interval allocated the data transmission request in step 2103. In other words, the resource coordinator 110 distributes the data transmission request on a scheduling time unit within a transmission period so as to match the data generation rate. The resource coordinator 110 distributes at least one mobile station for at least one transmission interval allocated the data transmission request. In so doing, at least one mobile station selected by the random function or all of the mobile stations can be allocated to the transmission interval allocated the data transmission request.

Next, the resource coordinator 110 determines a downlink transmission state per transmission interval of the base stations in step 2105. That is, the resource coordinator 110 schedules the data transmission request per transmission interval generated from the data generation rate, that is, downlink transmission of the base stations based on buffer occupancy state information. In other words, the resource coordinator 110 determines the transmission pattern of the base stations.

The embodiment of FIG. 21 can be applied to address a problem that resource information when the transmission pattern is applied is not accurately reflected due to transmission delay. However, though the transmission delay does not occur, the embodiment of FIG. 21 can be applied as one scheduling scheme.

According to a further embodiment of the present disclosure, the resource coordinator 110 can determine a transmission pattern of a reception period unit using information about all the mobile stations in a control information transmission period. That is, the resource coordinator 110 can use the information of the mobile stations regardless of the transmission interval. Such transmission pattern determination can enhance channel estimation efficiency of the mobile station by setting a pattern of a main interference source excluding a fading channel in the mobile station allocation of each base station, at a certain period. In this case, the resource coordinator 110 can determine the transmission pattern as shown in FIG. 22.

Figure 22:
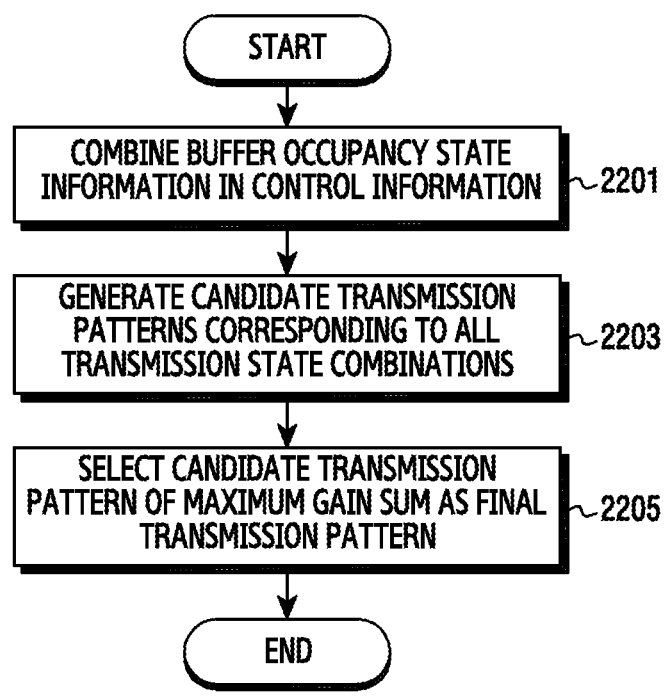
FIG. 22 depicts a transmission pattern determining procedure of a resource coordinator in a wireless communication system according to a further embodiment of the present disclosure.

FIG. 22 depicts a transmission pattern determining procedure of a resource coordinator 110 in a wireless communication system according to a further embodiment of the present disclosure. FIG. 22 illustrates an operating method of an apparatus functioning as the resource coordinator 110.

Referring to FIG. 22, the resource coordinator 110 combines buffer occupancy state information in control information in step 2201. That is, the resource coordinator 110 removes a time portion from the buffer occupancy state information per transmission interval of the control information received from base stations, and thus generates buffer occupancy state information for the whole transmission interval of the control information.

Next, the resource coordinator 110 generates candidate transmission patterns corresponding to all transmission state combinations in step 2203. When the number of the base stations is m, $2^m$-ary candidate transmission patterns can be generated.

Next, the resource coordinator 110 selects the candidate transmission pattern of the maximum gain sum as a final transmission pattern in step 2205. When the transmission state of any one base station is off, a gain of a mobile station interfered by the base station increases. Accordingly, the resource coordinator 110 calculates a gain of the base station from gains of mobile stations, and selects the candidate transmission pattern which maximizes a gain sum per base station, as the final transmission pattern.

Figure 23:
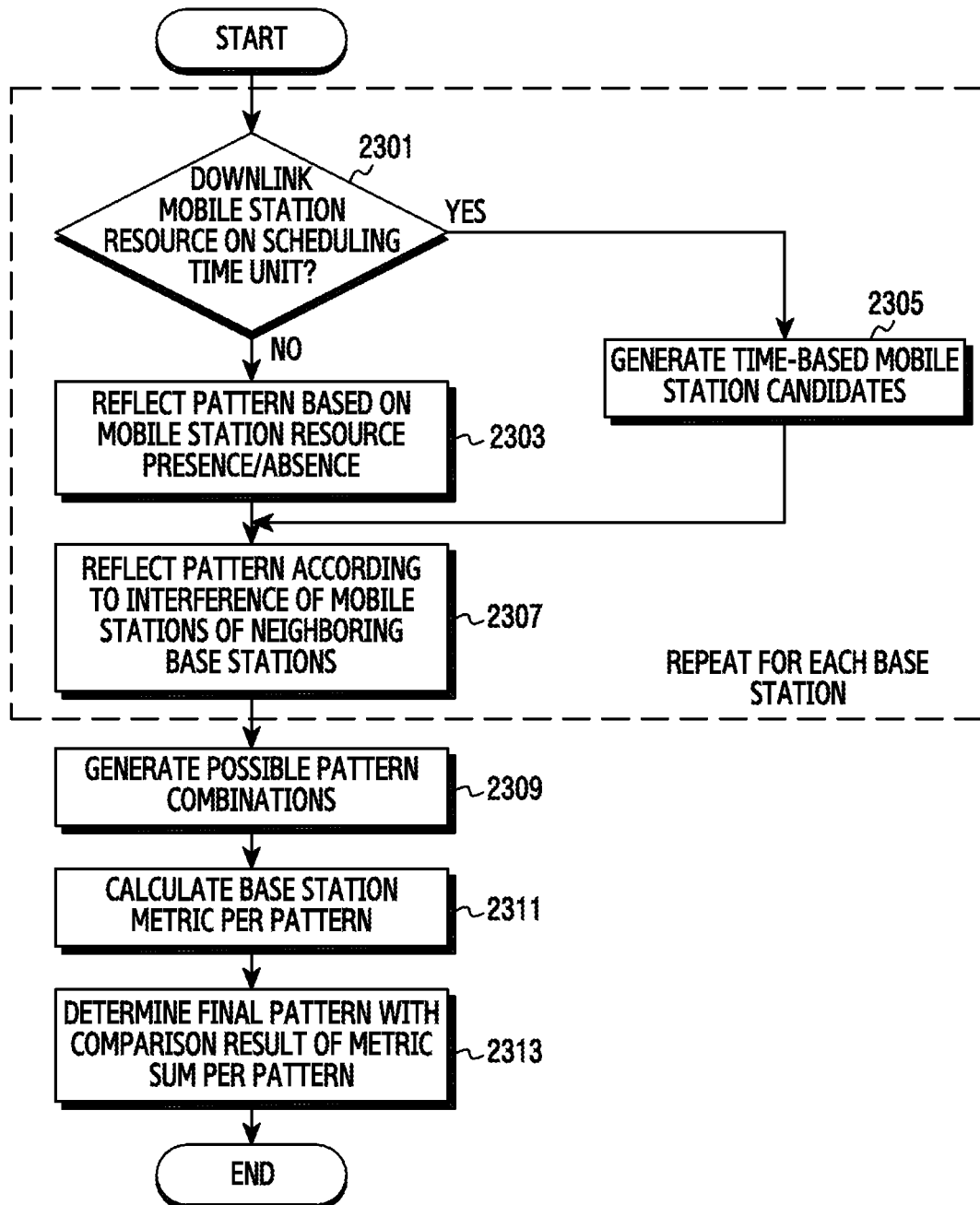
FIG. 23 depicts a transmission pattern determining procedure of a resource coordinator in a wireless communication system according to a further embodiment of the present disclosure.

FIG. 23 depicts a transmission pattern determining procedure of a resource coordinator 110 in a wireless communication system according to a further embodiment of the present disclosure. FIG. 23 illustrates an operating method after the resource coordinator 110 receives from base stations, control information for determining a transmission pattern. FIG. 23 illustrates a transmission pattern determining method for one transmission interval. Accordingly, when transmission patterns for a plurality of transmission intervals are determined, the procedure of FIG. 23 can be repeated. In the procedure of FIG. 23, steps 2301 through 2307 are repeated for base stations controlled by the resource coordinator 110. To facilitate explanations, the present disclosure now describes the steps 2301 through 2307 with a base station #1 as an example.

Referring to FIG. 23, the resource coordinator 110 determines whether there exists a downlink mobile station resource on a scheduling time unit for the base station #1 in step 2301. Herein, the mobile station resource indicates a resource requiring data transmission to a certain mobile station. Namely, based on control information received from the base station #1, the resource coordinator 110 determines whether there is data to transmit to at least one mobile station attached to the base station #1 on each scheduling time unit (e.g., subframe, PRB, physical channel, etc.). In other words, the resource coordinator 110 checks whether there exists buffered data, according to downlink buffer occupancy state information received from the base station #1.

When there is no mobile station resource, the resource coordinator 110 reflects the mobile station resource presence/absence to the transmission pattern in step 2303. That is, since there is no data to send from the base station #1 on a corresponding scheduling time unit, the resource coordinator 110 restricts the transmission of the base station #1, that is, sets transmission off in the corresponding scheduling time unit. Herein, the limited transmission includes signal transmission over a data channel (e.g., Physical Downlink Shared Channel (PDSCH)). In the transmission pattern, the bit value corresponding to off can be 1 or 0.

By contrast, when the mobile station resource exists, the resource coordinator 110 generates mobile station candidates on a scheduling time unit. Particularly, the resource coordinator 110 calculates a metric of each mobile station, and each mobile station attached to the base station #1 determines a gain according to the transmission off of the other base stations. For doing so, the resource coordinator 110 can determine channel gains according to presence/absence of up to N-ary interference sources using CSI of each mobile station. At this time, the channel gains can be calculated for all of the mobile stations included in the control information received from the base station #1, or the channel gain can be calculated for at least one mobile station selected as the candidate mobile station. The at least one candidate mobile station can be selected based on the metric. For example, the resource coordinator 110 can select top N-ary mobile stations having the high metric, as the at least one candidate mobile station. For example, the resource coordinator 110 can select the top N-ary mobile stations greatly interfered by a neighboring base station, as the at least one candidate mobile station. When the CSI in the control information is a multi-CSI feedback, the resource coordinator 110 can obtain a result in which the neighboring cell interference for the multi-feedback is set.

Next, the resource coordinator 110 reflects the interference of the mobile stations attached to neighboring base stations, in the transmission pattern in step 2307. Specifically, based on the CSI of the mobile stations attached to the base station #1, the resource coordinator 110 determines whether to the transmission off of the other base stations which interfere in the mobile stations is requested, that is, whether the transmission off of the other base stations benefits the mobile stations. For doing so, the resource coordinator 110 stores the CSI of the mobile stations received from the base station #1 in the memory, and determines the metric of the base station #1 with respect to the other base stations using the channel gain for the interference source presence/absence based on the CSI. For example, the metric of the base station #n can be determined as shown in Equation 1.

$$M_{I,K} = \max(M_{i,k}) = \max(G_{i,k} \cdot M_i)$$ Equation 1

In Equation 1, $M_{I,K}$ denotes the metric of the base station #1 for the base station #K, $M_{i,k}$ denotes the metric of the mobile station #i attached to the base station #1 for the base station #K, $G_{i,k}$ denotes a channel gain obtained by the mobile station #i in the transmission off of the base station #K, and $M_i$ denotes a basic metric of the mobile station #i. The basic metric $M_i$ can be defined variously according to a particular embodiment. For example, the basic metric $M_i$ can include a PF metric or a value calculated from the PF metric.

Based on Equation 1, the metric $M_{I,K}$ of the base station #1 determined by the transmission off of the neighboring base station #K is determined as a maximum value of the individual metric $M_{i,k}$ of each mobile station #i attached to the base station #1. In so doing, the mobile station #i used to determine the metric $M_{I,K}$ can include one or more of the mobile stations attached to the base station #1. Also, the individual metric of the mobile station #i can be determined as the channel gain $G_{i,k}$ obtained in the transmission off of the base station #K which interferes against the basic metric $M_i$. The basic metric can be defined as a PF metric which applies a weight individually managed by the resource coordinator 110 to the CSI of the mobile station #i. For doing so, the resource coordinator 110 can calculate the channel gain $G_{i,k}$ based on the CSI, that is, the multi-CSI feedback, RSRP, and uplink SRS power.

The resource coordinator 110 can determine whether the transmission off of each of the other base stations is required based on the metric of the base station. For example, the resource coordinator 110 can compare a gain of the transmission on state and a gain of the transmission off of a corresponding base station and thus determine whether the transmission off of the corresponding base station is required, that is, whether the transmission off is requested. Specifically, the resource coordinator 110 can determine whether the transmission off is required by comparing the basic metric $M_I$ obtained in the transmission on state of the base station #K with the metric $M_{I,K}$ determined by the transmission off of the base station #K. For example, the resource coordinator 110 can determine whether a condition of Equation 2 is satisfied.

$$M_{I,K} > w \cdot M_I$$ Equation 2

In Equation 2, $M_{I,K}$ denotes the metric of the base station #1 for the base station #K, $M_{i,k}$ denotes the metric of the mobile station #i attached to the base station #1 for the base station #K, w denotes the weight, and $M_I$ denotes the basic metric of the base station #1. According to Equation 2, when the metric $M_{I,K}$ is greater than the weighted basic metric $M_I$, effective off request for the base station #K can be determined. That is, when the gain of the transmission off of the base station #K exceeds a certain level, the effective request for the transmission off is determined.

As a result of the aforementioned process on all of the base stations, when there is no base station requiring the off state of the base station #K, that is, satisfying the gain condition, the base station #K is set to the transmission on state. In other words, when there is no request for the transmission off of the base station #K, the base station #K is indicated to the transmission on state in the transmission pattern. By contrast, when there is a request for the transmission off of the base station #K, the transmission constraint of the base station #K is undetermined.

As above, based on the transmission constraint of the base stations determined to the transmission on or the transmission off, the transmission pattern can be updated as shown in Table 2.

TABLE 2

| Base station #1 | Base station #2 | Base station #3 | Base station #4 | ... | Base station #N |
|---|---|---|---|---|---|
| 0 | X(undetermined) | 1 | X(undetermined) | ... | 1 |

Table 2 shows a transmission pattern for N-ary base stations. When the transmission off is expressed as '0' and the transmission on is expressed '1', the transmission pattern of Table 2 shows the transmission off of the base station #1 and the transmission on of the base station #3 and the base station #N. That is, the transmission pattern of Table 2 shows presence of data to send to the base station #1 and absence of transmission off requests for the base station #3 and the base station #N. Also, the transmission pattern of Table 2 shows presence of transmission off requests for the base station #2 and the base station #4.

Next, the resource coordinator 110 generates possible transmission pattern combinations in step 2309. That is, the resource coordinator 110 generates candidate transmission patterns based on all of available combinations for at least one other base station not determined to the transmission on or the transmission off. In other words, the resource coordinator 110 generates the candidate transmission patterns corresponding to all of combinations of possible transmission constraint values with respect to the base stations of the undetermined transmission constraint. For example, when the transmission constraints of the base station #2 and the base station #4 among the N-ary base stations are not determined as shown in Table 2, candidate transmission patterns can be generated as shown in Table 3.

TABLE 3

| | Base station #1 | Base station #2 | Base station #3 | Base station #4 | ... | Base station #N |
|---|---|---|---|---|---|---|
| combination a | 0 | 0 | 1 | 0 | ... | 1 |

TABLE 3-continued

|  | Base station #1 | Base station #2 | Base station #3 | Base station #4 | ... | Base station #N |
|---|---|---|---|---|---|---|
| combination b | 0 | 1 | 1 | 0 | ... | 1 |
| combination c | 0 | 0 | 1 | 1 | ... | 1 |
| combination d | 0 | 1 | 1 | 1 | ... | 1 |

Based on Table 3, since the transmission constraints of the base station #2 and the base station #4 are not determined, four (=2²) combinations in total are generated.

Next, the resource coordinator 110 calculates the base station metric per candidate transmission pattern generated in step 2311. In other words, the resource coordinator 110 determines a metric gain per base station for each case of the combinations. For example, the metric per base station can be determined as shown in Equation 1. Hence, metric combinations per base station corresponding to the candidate transmission patterns are determined. At this time, a channel gain of each mobile station is a channel gain according to the transmission off per base station which can be calculated based on the given CSI. For example, in the transmission off of the base station #1 and the base station #2, when the CSI of the mobile station #1 includes information which can reflect only the off state of the base station #1, the channel gain of the mobile station #1 can be calculated under a condition not assuming the transmission off state of the base station #2.

Next, the resource coordinator 110 compares a metric sum per candidate transmission pattern and determines a final transmission pattern according to a comparison result in step 2313. That is, the resource coordinator 110 calculates the sum of the metrics of the base stations for each candidate transmission pattern, and selects the candidate transmission pattern having the maximum matrix sum as the final transmission pattern.

According to the embodiment of FIG. 23, the resource coordinator 110 can set the transmission state of the base station not requiring the data transmission, to off in step 2305, and then set the transmission state of at least one base station based on whether the transmission off is requested in step 2307. According to another embodiment of the present disclosure, after the step 2305, the resource coordinator 110 can first determine no transmission of the base station having no downlink mobile station resource using time unit information provided from the base stations, and then first check whether there is a mobile station gaining from the not-transmitting base station among neighboring base stations. For example, when there are one or more mobile stations having $G_{i,K}$ which is the metric gain of the mobile station belonging to a neighboring base station due to the base station #K determined not to transmit, over a certain value, the resource coordinator 110 can determine the transmission on state of the corresponding base station #1. Next, the resource coordinator 110 can perform the pattern determination process in the step 2307.

The methods according to embodiments described in the claims or the specification of the present disclosure can be implemented in hardware, software, or a combination of hardware and software.

As for the software implementation, a computer-readable storage medium storing one or more programs (software modules) can be provided. One or more programs stored in the computer-readable storage medium can be configured for execution by one or more processors of an electronic apparatus. One or more programs can include instructions for enabling the electronic apparatus to execute the methods according to the embodiments described in the claims or the specification of the present disclosure.

Such a program (software module, software) can be stored to a random access memory, a non-volatile memory including a flash memory, a Read Only Memory (ROM), an Electrically Erasable Programmable Read Only Memory (EEPROM), a magnetic disc storage apparatus, a compact Disc (CD)-ROM, Digital Versatile Discs (DVDs) or other optical storage apparatus, and a magnetic cassette. Alternatively, the program can be stored to a memory combining part or all of those recording media. Also, a plurality of memories may be included.

Also, the program can be stored in an attachable storage apparatus accessible via a communication network such as Internet, Intranet, Local Area Network (LAN), Wide LAN (WLAN), or Storage Area Network (SAN), or a communication network by combining these networks. Such a storage apparatus can access the apparatus which carries out an embodiment of the present disclosure through an external port. Also, a separate storage apparatus on the communication network may access the apparatus of the present disclosure.

In the specific embodiments of the present disclosure, the elements included in the invention are expressed in a singular or plural form. However, the singular or plural expression is appropriately selected according to a proposed situation for the convenience of explanation, and the present disclosure is not limited to a single element or a plurality of elements. The elements expressed in the plural form may be configured as a single element and the elements expressed in the singular form may be configured as a plurality of elements.

While the specific embodiment has been described in the specification of the present disclosure, it will be understood that various changes can be made therein without departing from the scope of the present. Therefore, the scope of the invention is not limited to the described embodiments but is defined by the scope of the claims to be explained and their equivalents.

The invention claimed is:

1. A method performed by a first base station, the method comprising:
   receiving, from a second base station, a first message for a resource coordination of a resource allocation between the first base station and the second base station, the first message including:
      identification information associated with the second base station, and
      a second bitmap for indicating data allocation in the second base station;
   transmitting, to the second base station, a second message for the resource coordination, the second message including:
      identification information associated with the first base station, and
      a first bitmap for indicating data allocation in the first base station; and
   performing the resource coordination based on a resource constraint bitmap received from the second base station,
   wherein the resource constraint bitmap indicates whether a transmission is allowed per a transmission resource.

2. The method of claim 1,
wherein the first bitmap indicates whether data to transmit is allocated in each transmission interval in the first base station, and
wherein the second bitmap indicates whether data to transmit is allocated in each transmission interval in the second base station.

3. The method of claim 1, wherein the performing of the coordination comprises:
generating information about a whole transmission period by removing time distinction of the second message.

4. The method of claim 1,
wherein the first bitmap indicates whether resource for downlink data transmission is allocated or not in the first base station per a subframe in a time domain and per a physical resource block in a frequency domain, and
wherein the second bitmap indicates whether resource for downlink data transmission is allocated or not in the second base station per a subframe in a time domain and per a physical resource block in a frequency domain.

5. The method of claim 1,
wherein the first message includes information of a frame number where the first bitmap starts to be valid,
wherein the second message includes information of a frame number where the second bitmap starts to be valid.

6. An apparatus of a first base station, the apparatus comprising:
at least one transceiver; and
at least one processor coupled to the at least one transceiver and configured to:
control the at least one transceiver to receive, from a second base station, a first message for a resource coordination of a resource allocation between the first base station and the second base station, the first message including:
identification information associated with the second base station, and
a second bitmap for indicating data allocation in the second base station,
control the at least one transceiver to transmit, to the second base station, a second message for the resource coordination, the second message including:
identification information associated with the first base station, and
a first bitmap for indicating data allocation in the first base station, and
perform the resource coordination based on a resource constraint bitmap received from the second base station,
wherein the resource constraint bitmap indicates whether a transmission is allowed per a transmission resource.

7. The apparatus of claim 6,
wherein the first bitmap indicates whether data to transmit is allocated in each transmission interval in the first base station, and
wherein the second bitmap indicates whether data to transmit is allocated in each transmission interval in the second base station.

8. The apparatus of claim 6, wherein the processor is, to perform the coordination, further configured to generate information about a whole transmission period by removing time distinction of the second message.

9. The apparatus of claim 6,
wherein the first bitmap indicates whether resource for downlink data transmission is allocated or not in the first base station per a subframe in a time domain and per a physical resource block in a frequency domain, and
wherein the second bitmap indicates whether resource for downlink data transmission is allocated or not in the second base station per a subframe in a time domain and per a physical resource block in a frequency domain.

10. The apparatus of claim 6,
wherein the first message includes information of a frame number where the first bitmap starts to be valid,
wherein the second message includes information of a frame number where the second bitmap starts to be valid.

* * * * *